(12) United States Patent
Ussery et al.

(10) Patent No.: US 7,567,921 B1
(45) Date of Patent: Jul. 28, 2009

(54) METHOD AND SYSTEM FOR PROVIDING COMMERCIAL INFORMATION AND OPERATING AN ELECTRONIC COMMERCE SYSTEM OVER A GLOBAL COMMUNICATIONS NETWORK WITH COMPANY AND CONSTITUENCY NODES

(75) Inventors: Troy Alan Ussery, Plano, TX (US); Jeffrey Douglas Balcombe, Plano, TX (US); Dean Rucinski, Plano, TX (US)

(73) Assignee: Business-To-Investor, Inc., Richardson, TX (US)

( * ) Notice: Subject to any disclaimer, the term of this patent is extended or adjusted under 35 U.S.C. 154(b) by 981 days.

(21) Appl. No.: 09/694,425

(22) Filed: Oct. 23, 2000

(51) Int. Cl.
G06Q 30/00 (2006.01)
G06Q 40/00 (2006.01)
G06F 17/30 (2006.01)
G06F 7/00 (2006.01)
H04L 9/00 (2006.01)

(52) U.S. Cl. .................... 705/26; 705/37; 707/100; 713/166

(58) Field of Classification Search .............. 705/1, 705/22, 26, 27, 28, 29, 51, 25, 37, 54; 713/166; 707/100
See application file for complete search history.

(56) References Cited

U.S. PATENT DOCUMENTS

| | | | |
|---|---|---|---|
| 5,729,694 A * | 3/1998 | Holzrichter et al. | ........... 705/17 |
| 5,950,206 A * | 9/1999 | Krause | ..................... 707/104.1 |
| 6,092,050 A * | 7/2000 | Lungren et al. | ................ 705/10 |
| 6,275,825 B1 * | 8/2001 | Kobayashi et al. | ............. 707/9 |
| 6,393,410 B1 * | 5/2002 | Thompson | ................... 705/37 |
| 6,446,053 B1 * | 9/2002 | Elliott | ........................ 705/400 |
| 6,517,587 B2 * | 2/2003 | Satyavolu et al. | ........ 715/501.1 |
| 6,549,891 B1 * | 4/2003 | Rauber et al. | |
| 6,578,010 B1 * | 6/2003 | Teacherson | |
| 6,711,575 B1 * | 3/2004 | Applewhite et al. | ......... 707/100 |

OTHER PUBLICATIONS

Doost, Roger K., "How to Improve Client's Access Control Over Programs and Files," The CPA Journal, New York, Mar. 1989, vol. 59, iss. 3, pp. 44-46.*

* cited by examiner

*Primary Examiner*—Yogesh C. Garg
*Assistant Examiner*—Amee A. Shah

(57) ABSTRACT

An electronic commerce system for use over a global communications network and having both company nodes and constituency nodes comprises a data repository and a communications controller. The data repository stores data files contain commercial information relating to the company associated with a company node. The communications controller allow a specific company node to modify commercial information in the data files relating to the respective company and to control times at which selected portions of the commercial information is first made available to the constituency nodes, propagates communication interfaces accessible by the constituency nodes with selected portions of the commercial information under direction of the company nodes, and gathers feedback information representative of constituency response to the constituency nodes accessing the communication interfaces.

22 Claims, 10 Drawing Sheets

METHOD AND SYSTEM FOR PROVIDING COMMERCIAL INFORMATION AND OPERATING AN ELECTRONIC COMMERCE SYSTEM OVER A GLOBAL COMMUNICATIONS NETWORK WITH COMPANY AND CONSTITUENCY NODES

TECHNICAL FIELD OF THE INVENTION

The present invention is directed, in general, to electronic commerce systems and related methodologies and, more specifically, to electronic commerce systems for providing commercial information to a plurality of constituency nodes via a global information network and methods of operating the same.

BACKGROUND OF THE INVENTION

The commercial availability of more efficient, reliable and cost effective computers has enabled businesses and individuals to rely ever increasingly upon the same, as well as on related peripheral devices, to meet their information and processing needs.

In recent years, the immeasurable gains in technology experienced by the computer and communications industries have enabled the growth of global communications networks (e.g., the Internet). As a result thereof, there has been exponential growth in businesses that provide information and execute transactions via the Internet, such business are commonly said to be engaged in "electronic commerce."

One important sub-area of electronic commerce for both private and publicly-traded companies is investor relations. Global communications networks, such as the Internet, provide an infrastructure, or "backbone," that facilitates communication channels between such companies and their intended constituencies (e.g., media entities, financial analysts, financial services entities, institutional funds, individual investors, banking entities, etc.). At present, the infrastructure of the Internet has been used for web-casts, conference calls, press releases, and, to a lesser extent, road shows, all in an attempt to meet their investor relations needs.

Unfortunately, the above-identified uses are commonly viewed as too infrequent, not timely or lacking the necessary detail to meet the information needs of a company's constituencies. This is the situation with both publicly-traded and privately-held companies. Because there is no system nor other technology that provides a means for a company to near-continuously communicate information to its constituencies, a need exists in the art for a means, via a global communications network, for facilitating or providing near-instantaneous communications channels between companies and their intended constituencies.

In the United States, the Securities and Exchange Commission (the "SEC") is instituting a fair disclosure regulation. As in other countries, the SEC has significant and increasing concerns that information is being ineffectively communicated by publicly traded companies to select members of their constituencies. It is common for such communications to be performed on a one-on-one basis, causing the same to be inefficient, time-consuming and, worst, selective.

The lack of sophistication of conventional systems and technologies combined with their inherent inability to provide broad-reaching communications across all constituencies creates isolated pockets of informed investors that increase a company's exposure to risk of selective disclosure. Therefore, in addition to the broad need in the art for a means for an intelligent communications conduit through which any company can near-instantaneously communicate relevant information to its constituencies, there exists a further need for a communications conduit that provides: (i) a standardized data repository indexing and cross-referencing company information by each subject of significance to one or more constituencies, (ii) an automated interface for placing or updating information disclosures on the communications conduit, and (iii) a controller that monitors and analyzes one or more constituencies understanding and reaction to such new or updating information disclosures.

SUMMARY OF THE INVENTION

To address the above-discussed deficiencies of the prior art, it is a primary object of the present invention to provide an electronic commerce system for monitoring communication of information by a company node to constituency nodes and analyzing constituency understanding and reaction to such information communication.

According to an exemplary embodiment, the electronic commerce system, which is for use over a global communications network includes both company nodes and constituency nodes, comprises a data repository and a communications controller. The data repository is operable to store data files associated with the company nodes, wherein the company nodes populate respective associated data files with commercial information. The communications controller is operable to (i) allow a specific company node to modify commercial information that is stored in data files relating to that specific company and to control times at which selected portions of the commercial information in the data files relating to that specific company are first made available to the constituency nodes, (ii) propagate communication interfaces accessible by the constituency nodes with selected portions of the commercial information under direction of the company nodes, and (iii) gather feedback information representative of constituency response to the constituency nodes accessing the communication interfaces. Advantageously, the company node, through the communications controller and associated data repository, is operable to provide an interactive system that enables the company to generate and near-continuously communicate information to its constituency via the global communications network, for instance the Internet.

According to a related advantageous embodiment, the company node is also operable to store, index and relate the company's responses, detailing the past, present and future of the company and its relevant industry, all in the data repository. An important aspect of one such embodiment is the ability of the company node to control when (that is, times at which) publication of at least selected portions of the information stored in the data repository is available to the constituencies (e.g., to fairly disseminate, distribute or otherwise make available that information). This may advantageously be accomplished through the communications controller which may suitably be arranged to enable the company node to modify one or more data records stored in the data repository, and to decide when such pending modified information is complete (e.g., technically, factually or legally accurate, thorough, or otherwise satisfactory for publication). Upon a determination of completion, the company node may direct the communications controller to publish such information from the data repository for access by the constituency nodes.

According to a yet further related embodiment, the company node monitors constituency understanding and reaction to the company's information communications and organizes this information into customizable, real-time analysis reports for the company. Further, the company's communications may suitably be translated by the communications controller into multiple languages, organized into audio or video presentations, or the like to assure visibility to the global community.

An important aspect thereof is the company node's ability to monitor segments of the constituency's understanding and reaction to information communication throughout the world. For instance, the company node is operable to facilitate development of high and low income statement forecasts by members of the financial community. Furthermore, the company, vis-a-vis the company node, is operable to develop a constituency, or sub-constituency, consensus estimate against which the company can comment their relative outlook.

Before undertaking more detailed discussions of preferred embodiments of the present invention, the meaning of the following terms and phrases should be understood: the term "or" is inclusive, meaning and/or; the term "include" and derivatives thereof mean inclusion without limitation; the phrase "associated with" and derivatives thereof may mean to include within, interconnect with, contain, be contained within, connect to or with, couple to or with, be communicable with, juxtapose, cooperate with, interleave, be a property of, be bound to or with, have, have a property of, or the like; and the term "controller" is defined broadly to include any implementation of the present invention, whether in software, firmware, hardware or at least two of the three.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which like numbers designate like objects and in which.

DETAILED DESCRIPTION

FIGS. 1A through 4, discussed below, and the various embodiments used to describe the principles of the present invention in this patent document are by way of illustration only and should not be construed in any way to limit the scope of the invention. Those skilled in the art will understand that the principles of the electronic commerce systems and methods of operating the same set forth herein may be implemented over any suitably arranged communications network or system.

Figure 1A:
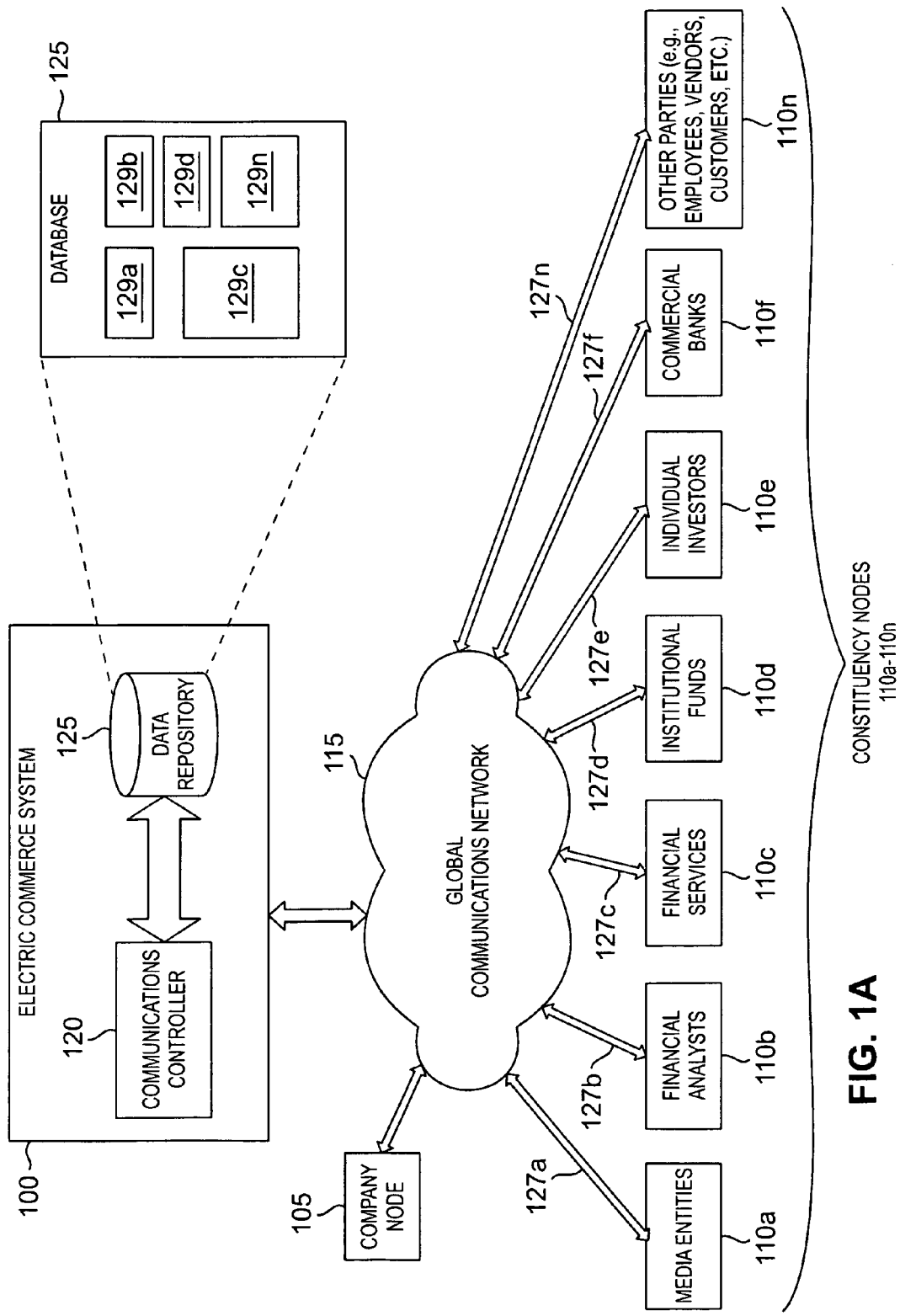
FIG. 1A illustrates a detailed block diagram of an exemplary electronic commerce system for monitoring communication of information by a company node to constituency nodes and for analyzing constituency understanding and reaction to such information communication, all in accordance with the principles of the present invention.

Referring initially to FIG. 1A, illustrated is a detailed block diagram of an exemplary electronic commerce system 100 for monitoring communication of information by a company node 105 to constituency nodes 110a to 110n via a global communications network 115 and for analyzing understanding and reaction to such information communication by one or more of such constituency nodes 110a to 110n, all in accordance with the principles of the present invention. For the purposes hereof, the terms "node" and "electronic commerce system" are defined broadly to mean any suitable computer system, or network of computer systems, whether public or private, whether wired or wireless, and, with particular respect to "nodes," operating to perform the functions relevant either to the company node 105 or to at least one of the constituency nodes 110a to 110n.

Exemplary electronic commerce system 100 illustratively includes a communications controller 120 and a data repository 125, and is broadly operative to provide:

(i) indexing and cross-referencing of company information by each subject of significance within data repository 125 to one or more constituencies;

(ii) an automated interface for placing or updating information disclosures on the communications conduit via global communications network 115 to constituency nodes 110a to 110n; and (iii) monitoring and analyzing one or more constituencies' understanding and reaction to such new or updated information disclosures using communications controller 120.

The exemplary constituency nodes illustratively include a media entities node 110a, a financial analysts node 110b, a financial services node 110c, institutional funds node 110d, an individual investors node 110e, a commercial banks node 110f and an other parties node 110n (e.g., employees, vendors, customers, affiliates, subsidiaries, etc.). Each of these exemplary nodes is operative to perform functions relevant to information processing and analysis needs, and more particularly:

(i) exemplary media entities node 110a is illustratively representative of one of many media entities nodes associated, or connected, with company node 105 via global communications network 115; the term "media," in this instance, is defined broadly to include any means of mass communication, such as newspapers, magazines, radio, television, or the like;

(ii) exemplary financial analysts node 110b is illustratively representative of one of many financial analysts nodes associated, or connected, with company node 105 via global communications network 115; the term "financial analyst," in this instance, is defined broadly to include any entity (e.g., person, company, etc.) skilled at analyzing the financial state of private or public companies or industry groups, and makes buy and sell recommendations on the securities of such companies or groups;

(iii) exemplary financial services node 110c is illustratively representative of one of many financial services nodes associated, or connected, with company node 105 via global communications network 115;

(iv) exemplary institutional funds node 110d is illustratively representative of one of many institutional funds nodes associated, or connected, with company node 105 via global communications network 115; the term "institutional fund," in this instance, is defined broadly to include any entity that publicly trades large volumes of securities via a public markets;

(v) exemplary individual investors node 110e is illustratively representative of one of many individual investors nodes associated, or connected, with company node 105 via global communications network 115; the term "individual investor," in this instance, is defined broadly to include any individual that publicly trades securities via a public markets or purchases securities of privately-held companies;

(vi) exemplary commercial banks node 110f is illustratively representative of one of many commercial banks nodes associated, or connected, with company node 105 via global communications network 115; the term "commercial bank," in this instance, is defined broadly to include any entity that keeps money for saving or commercial purposes or is invested, supplied for loans, or exchanged; and (vii) exemplary other parties node 110n is illustratively representative of one of many employees, vendors, customers, affiliates, subsidiaries, or the like associated, or connected, with company node 105 via global communications network 115; and wherein, according to a related embodiment, one or more of these other parties may have controlled access to information within data repository 125 that is not published for general constituency access.

Finally, exemplary global communications network 115 is a wide area network that links together many thousands of smaller sub-networks, for instance, the Internet. These sub-networks are owned by different businesses, government entities, universities, and other organizations, all of which collectively include the constituencies.

According to an exemplary embodiment, electronic commerce system 100 uses global communications network 115 as a backbone to facilitate communications by and between company nodes (here, only company node 105) and constituency nodes 110. Exemplary data repository 125 is operable to store data files 129a to 129n associated with the company nodes 105, wherein the company nodes 105 populate respective associated data files 129 with commercial information. Exemplary communications controller 120 is operable to (i) propagate constituency, or, more broadly, communication, interfaces 127a to 127n accessible by constituency nodes 110 with selected portions of the commercial information under direction of company nodes 105, and (ii) gather feedback information representative of constituency response to constituency nodes 110 accessing communication interfaces 127. It is understood that each of communication interfaces 127 is operable to associate, directly or indirectly, ones of company nodes 105, constituency nodes 110 and electronic commerce system 100, whereby such association facilitates communication of such commercial information in at least one of a wired or a wireless connection, including electric, magnetic or optic formats.

Advantageously, electronic commerce system 100, through communications controller 120 and associated data repository 125, is operable to provide an interactive system that enables the company to generate and near-continuously communicate information fairly to its constituency via global communications network 115, for instance the Internet. Company node 105 is further operable to store, index and relate the company's responses, detailing the past, present and future of the company and its relevant industry, all via communications controller 120 and data repository 125.

According to the present embodiment, company node 105 is operable to control "when" publication (e.g., fair dissemination, distribution or other availability) of at least selected portions of the information stored in data repository 125 is available to constituency nodes 110. This may advantageously be accomplished through communications controller 120 which is illustratively arranged to enable company node 105 to modify one or more data records 129a, 129b, 129c, 129d and 129n stored in data repository 125, (collectively referred to as data files 129) and to decide when such pending modified commercial information is complete (e.g., technically, factually or legally accurate, thorough, or otherwise satisfactory for publication). Upon a determination of completion, company node 105 may direct communications controller 120 to publish such information from data repository 125 for access by constituency nodes 110. The foregoing feature ensures that "draft"-type versions of commercial information is disseminated prematurely.

It is important to note that the functionality of electronic commerce system 100 above-described may suitably be implemented centrally, in a single computer system or network of computer systems, or distributed over multiple associated computer systems or network of computer systems. For instance, upon installation, electronic commerce system 100 may, in part, be instantiated on ones of company nodes 105 and constituency nodes 110.

Figure 1B:
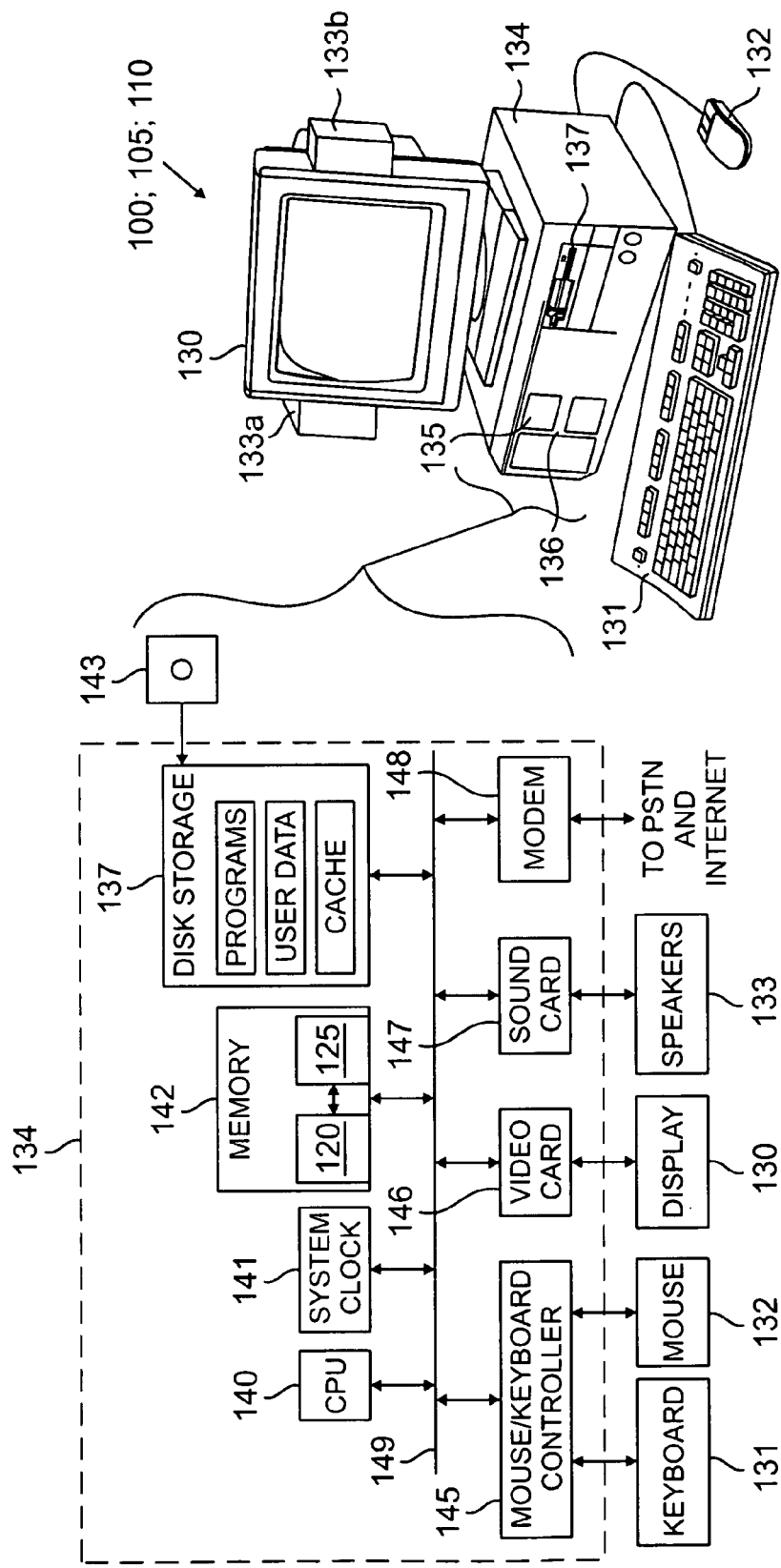
FIG. 1B illustrates an isometric view of an exemplary computer system that may suitably be used as the electronic commerce system, the company node or any of the constituency nodes of FIG. 1A, all in accordance with the principles of the present invention.

Referring next to FIG. 1B, illustrated is an isometric view of an exemplary computer system (generally designated 100; 105; 110), such as a personal computer system ("PC") for example, that may suitably be arranged to function as electronic commerce system 100, company node 105 or any of constituency nodes 110a to 110n, all according to the principles of the present invention. For the purposes of illustration, concurrent reference is made to FIG. 1A.

Exemplary PC 100; 105; 110 is illustratively associated with a display device 130, keyboard 131, mouse 132, and speakers 133a and 133b, which operate to allow communication between PC 100; 105; 110 and a user (not shown). Exemplary display device 130 provides a screen area for display of graphical data under the control of an exemplary graphical user interface ("GUI") operating system (O/S) and browser application executing within PC 100; 105; 110. The exemplary GUI operating system manages division of computation logic resources among various application tasks executing in PC 100; 105; 110. The GUI operating system may divide the screen of display device 105 into a plurality of suitably arranged windows that display data corresponding to each of the application tasks.

PC 100; 105; 110 is further associated with a chassis 134, a dedicated hardware reset switch 135, a power switch 136 and a floppy disk drive 137. PC 100; 105; 110 illustratively includes within chassis 134 various electronic components, namely, a central processing unit ("CPU") 140, system clock 141, and memory 142, which typically comprises volatile RAM memory capable of storing, in the case of electronic commerce system 100, for example, (i) data repository 125 and (ii) software instructions that are retrievable and executable by CPU 140 to instantiate communications controller 120.

PC 100; 105; 110 also comprises disk storage device 137. Disk storage device 137 is representative of one or more readable/writeable fixed storage devices, such as a hard drive, or removable storage devices capable of receiving removable storage media 143, which may comprise, for example, a floppy disk, a ZIP disk, a CD-ROM disk, a DVD disk, etc. In an advantageous embodiment of the present invention, removable storage media 143 may be used to store, in the case of electronic commerce system 100, (i) at least a portion of data repository 125 or (ii) at least a portion of the software instructions that are retrievable and executable by CPU 140 to instantiate communications controller 120.

PC 100; 105; 110 also comprises mouse/keyboard controller 145, video card 146, sound card 147, and modem 148. The various components of PC 100; 105; 110 transfer data and control signals across bus 149. The user inputs data and commands to PC 100; 105; 110 via mouse/keyboard controller 145, which provides an interface between keyboard 131 and mouse 132 and CPU 140. Exemplary modem 148 provides a communication interface between PC 100; 105; 110 and global communications network 115 (possibly via a publicly switched telephone network ("PSTN"); in alternate embodiments, modem 148 may be any suitably arranged network connectivity device that facilitates communication (wired or wireless) between PC 100; 105; 110 and other nodes associated with global communications network 115). The GUI operating system of PC 100; 105; 110 transfers browser application screens and web page images to display device 130 via video card 146.

Those skilled in the pertinent art will note that the principles of the present invention may be implemented in any suitable computer system environment, whether micro, mini, mainframe, super or like computers systems, including multi and parallel processing environments, wireless implementations using webphones, personal data assistants ("PDAs") or the like, as well as computer system networks. To that end, conventional computer system architecture is more fully discussed in THE INDISPENSABLE PC HARDWARE BOOK, by Hans-Peter Messmer, Addison Wesley (2nd ed. 1995) and COMPUTER ORGANIZATION AND ARCHITECTURE, by William Stallings, MacMillan Publishing Co. (3rd ed. 1993); conventional computer and communications network design is more fully discussed in DATA NETWORK DESIGN, by Darren L. Spohn, McGraw-Hill, Inc. (1993); conventional data communication is more fully discussed in VOICE AND DATA COMMUNICATIONS HANDBOOK, by Bud Bates and Donald Gregory, McGraw-Hill, Inc. (1996); DATA COMMUNICATIONS PRINCIPLES, by R. D. Gitlin, J. F. Hayes and S. B. Weinstein, Plenum Press (1992); and THE IRWIN HANDBOOK OF TELECOMMUNICATIONS, by James Harry Green, Irwin Professional Publishing (2nd ed. 1992). Each of the foregoing publications is incorporated herein by reference for all purposes.

It should be noted that use of the Internet is but an example of global communications network 115 in accordance with the principles hereof, the information, or content, on the sub-networks comprising the same is accessible to outside parties by means of the World Wide Web (the "Web"). The Web comprises software, standardized protocols, and other widely-accepted conventions that enable a computer user (or constituency) to browse (or navigate) through the vast amounts of data content, and with respect to the present invention, through the vast amounts of data content resident on the computer system (e.g., computer(s), server(s), sub-sub-networks) of electronic commerce system 100.

Figure 1C:
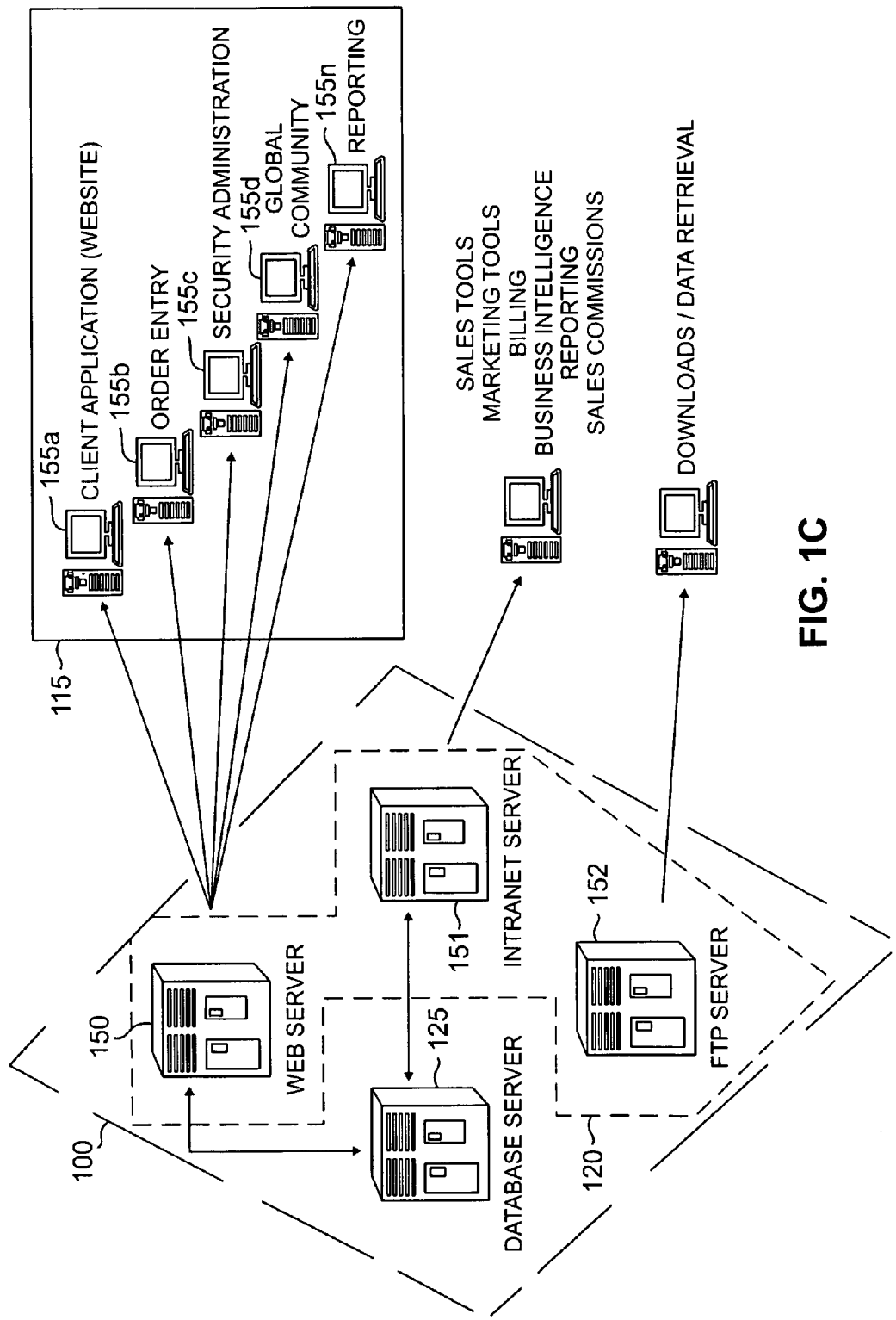
FIG. 1C illustrates a detailed block diagram of an exemplary hardware architecture of the electronic commerce system of FIG. 1A, all in accordance with the principles of the present invention.

Referring next to FIG. 1C, illustrated is a detailed block diagram of an exemplary hardware architecture of electronic commerce system 100 of FIG. 1A, all in accordance with the principles of the present invention. Again, concurrent reference is made to the discussion of FIG. 1A for purposes of illustration.

Exemplary electronic commerce system 100 illustratively includes a communications controller 120 and a data repository 125, which again may suitably be centralized or distributed, whether in whole or in part. Exemplary communications controller 120 comprises a web server 150, an intranet server 151 and a FTP server 152, and exemplary data repository 125 illustratively includes a database server.

Exemplary web server 150 is operable to transfer/deliver Web pages over global communications network 115. Exemplary intranet server 151 is operable to transfer/deliver Web pages and other information via a privatized network belonging to an organization, for instance the "company," and is accessible only by the organization's subscribers, members, employees, or others with authorization; the intranet's Web sites look and operate similar to any other Web site, but a firewall associated with the intranet server 151 fends off unauthorized access. Exemplary FTP server 152 is operable to transfer information files via global communications network 115.

According to the illustrated embodiment, web server 150, intranet server 151, FTP server 152 and data repository 125 cooperate to monitor and to control communication of information by electronic commerce system 100 on behalf of company node 105 to constituency nodes 110a to 110n, to develop through subscriber/member interaction company specific information for selective fair communication to constituency nodes 110a to 110n, and to analyze constituency understanding and reaction to such information communication.

Web server 150 provides a plurality of interfaces over global communications network 115, including client application interface 155*a*, order entry interface 155*b*, security administration interface 155*c*, global community interface 155*d*, and reporting interface 155*n*. Company node 105 is operable, vis-a-vis the foregoing interfaces, to store, index and relate the company's responses, detailing past, present and future of the company and its relevant industry. In a related embodiment, information communications may suitably be translated by communications controller 120 into multiple languages, organized into audio or video presentations, or the like to assure visibility to the global community for maximum dissemination.

Again, it is important to note that exemplary company node 105 is operable to control when publication of at least selected portions of the information stored in data repository 125 is to be made available to the constituencies. Communications controller 120 enables company node 105 to modify one or more data files 129 stored in data repository 125, and to decide when such pending modified information is complete. Upon a determination of completion, company node 105 may direct communications controller 120 to publish such information from data repository 125 for access by constituency nodes 110.

Intranet server 151 provides a plurality of sub-controllers, including sub-controllers operable to provide sales tools, marketing tools, billing tools, business intelligence, reporting, sales commissions, etc., ones of which that cooperatively monitor constituency understanding and reaction to information communications of the company and which operates to organize this information into customizable, real-time analysis reports for the company.

An important aspect thereof is the functionality of electronic commerce system 100 to monitor segments of ones of constituency nodes 110*a* to 110*n* to understand and reaction to information communication. For instance, electronic commerce system 100 is operable to develop a constituency, or sub-constituency, consensus estimate that operates to guide members of the financial community in developing high and low income statement forecasts against which the organization or company can comment their relative outlook.

Figure 2A:
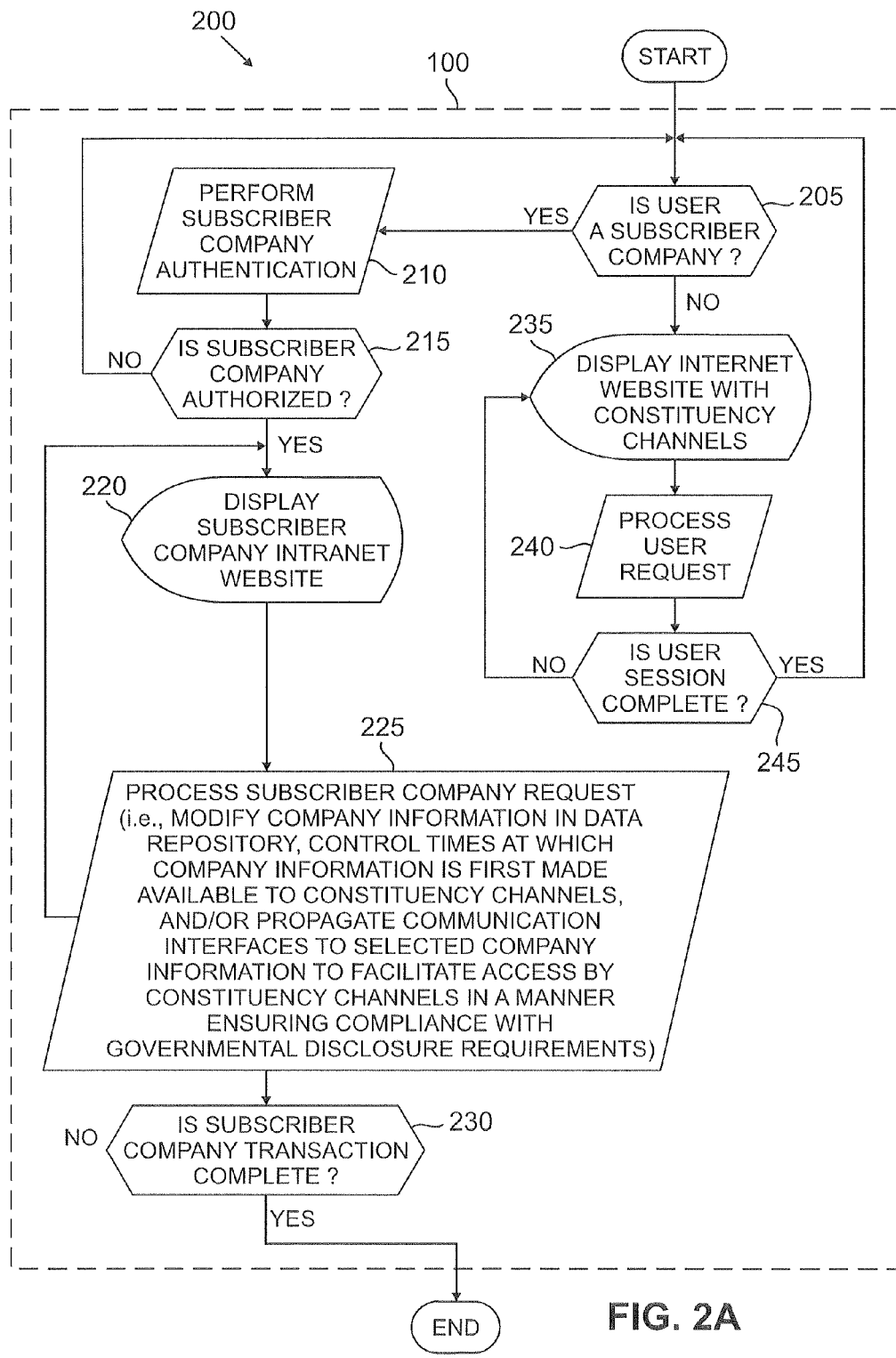
FIG. 2A illustrates a flow diagram of an exemplary method of operating the electronic commerce system of FIG. 1 for monitoring communication of information by the company node to ones of constituency nodes via a global communications network, all in accordance with the principles of the present invention.

Referring next to FIG. 2A, illustrated is a flow diagram (generally designated 200) of an exemplary method of operating electronic commerce system 100 for monitoring and controlling communication of information by company node 105 to ones of constituency nodes 110*a* to 110*n* via a global communications network 115 and for analyzing and understanding reaction to such information communication by one or more of such ones of constituency nodes 110*a* to 110*n*, all in accordance with the principles of the present invention. For purposes of illustration, concurrent reference is made to FIGS. 1A to 1C.

To begin, communications controller 120 of electronic commerce system 100 determines whether a current user is a subscriber company (e.g., company node 105) and, if so ("Y" branch of decision step 205), performs subscriber company authorization (process step 210). According to the illustrated embodiment, one advantageous method for performing subscriber company authorization involves a conventional multi-level password protection scheme (e.g., public/private key scheme, etc.), though any suitably arranged system that limits, with respect to those data files 129 associated with the subscriber company, access to the same to designated personnel of the subscriber company. In a related exemplary embodiment, performing subscriber company authorization includes an interactive voice recognition ("IVR") system. The IVR system is operable to verify the identity of such select designated personnel of the subscriber company (exemplary embodiment is discussed with reference to FIG. 4).

If current user is an authorized subscriber company ("Y" branch of decision step 215), communications controller 120 (i) displays a selected view of a portion of data repository 125 as a function of identifying the subscriber company (process 220), and (ii) processes subscriber company request to review, modify or otherwise process the selected view of the portion of data repository 125 (process step 225); namely, select ones of data files 129. If the subscriber company transaction is not complete, control returns to process step 220. When the subscriber company transaction is complete, the process continues (decision step 230).

An important aspect of note again is that multiple versions of various ones of data files 129 may suitably be maintained to reflect varying stages of communications in process (i.e., additions, modifications, etc. to commercial information) prior to publication for accessability by constituency nodes 110. Exemplary company node 105 is operable through communications controller 120 to provide an interactive system that enables the company to generate and near-continuously communicate information to its constituency via global communications network 115.

Figure 2B:
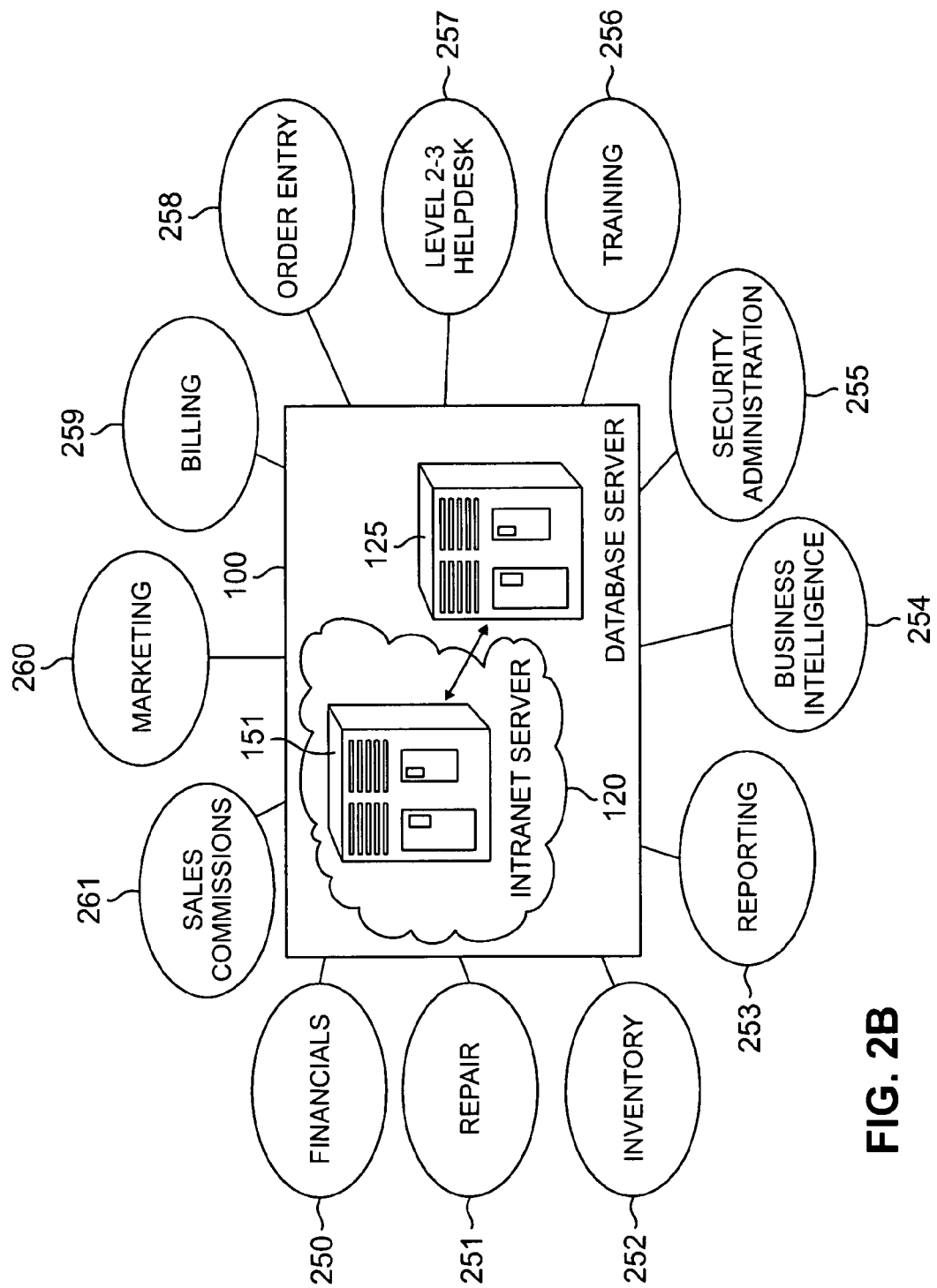
FIG. 2B illustrates a conceptual block diagram of a selected view of the portion of a data repository generated as a function of identifying a subscriber company, all in accordance with the principles of the present invention.

Referring momentarily to FIG. 2B, illustrated is a conceptual block diagram of the selected view of the portion of data repository 125 generated as a function of identifying the subscriber company (here, via company node 105) and displayed at an intranet web site intranet server 151. The selected view of the portion of data repository 125 displayed at the intranet web site illustratively includes financials sub-portion 250, repair sub-portion 251, inventory sub-portion 252, reporting sub-portion 253, business intelligence sub-portion 254, security administration sub-portion 255, training sub-portion 256, helpdesk sub-portion 257, order entry sub-portion 258, billing sub-portion 259, marketing sub-portion 260, and sales commission sub-portion 261. The foregoing is introduced by way of example and is neither considered an exclusive nor an inclusive representation of possible sub-portions. An important aspect hereof is that electronic commerce system 100, via communications controller 120 and data repository 125, provides a subscriber company with (i) standardized data repository 125 that indexes and cross-references company information stored in ones of data files 129 by subject and available to one or more constituencies, and (ii) an interface between company node 105 and electronic commerce system 100 that enables the subscriber company to place or update information disclosures on the communications conduit, e.g., constituency interfaces 127.

Referring again to the discussion of FIG. 2A, if communications controller 120 determines whether a current user is not a subscriber company (e.g., constituency node 110*a* to 110*n*; "N" branch of decision step 205), communications controller (i) displays a selected view of a portion of data repository 125 as a function of identifying the constituency node 110 (process step 235; preferably the interface is a web site or a portion of a web site); and (ii) processes constituency node 110 request to review or otherwise process the selected view of the portion of data repository 125 (process step 240). Through communications controller 120, a constituency node 110 is thereby operable to view company generated information communications or commercial information through constituency interface 127 via global communications network 115. If the user session is not complete, control returns to process step 235. When the user session is complete, control returns to process step 205 (decision step 245).

Figure 2C:
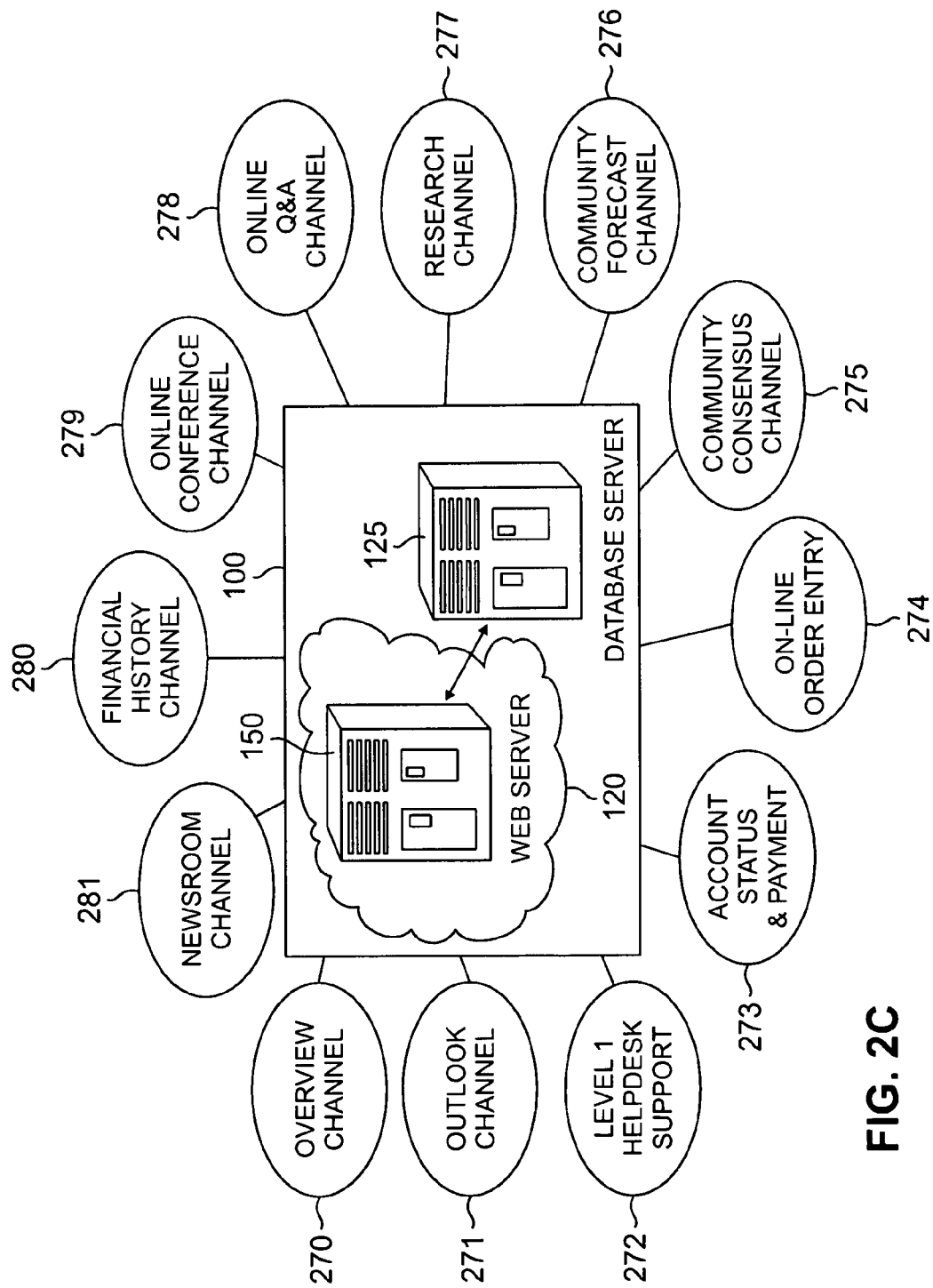
FIG. 2C illustrates is a conceptual block diagram of a selected view of the portion of data repository generated as a function of identifying a constituency node, all in accordance with the principles of the present invention.

Turning momentarily to FIG. 2C, illustrated is a conceptual block diagram of the selected view of the portion of data repository 125 generated as a function of identifying the constituency node 110 (identified by specific constituency node, constituency-node type, etc.) and displayed at an Internet web site via constituency interface 127. The selected view of the portion of data repository 125 displayed at the Internet web site is illustratively organized and indexed into "channels," wherein each channel includes all relevant topics made accessible through detailed outlines, for instance, overview channel 270, outlook channel 271, helpdesk support 272, account status and payment 273, online order entry 274, community consensus channel 275, community forecast channel 276, research channel 277, online q&a channel 278, online conference channel 279, financial history channel 280 and newsroom channel 281. For the purposes hereof, the term "channel" is defined broadly to include any communications path between two or more nodes or electronic commerce systems wherein such communications path may suitably refer to a physical medium (e.g., the wires) or to a set of properties distinguishing one channel from another channel; for instance, channels may refer to particular frequencies at which radio waves are transmitted, to specific discussions/communications between two or more nodes or electronic commerce systems, or the like.

Exemplary overview channel 270 is operable to provide an up-to-date and detailed outline addressing a given company's operations, industry and positioning. Exemplary outlook channel 271 is operable to provide a detailed discussion on future opportunities and risks associated with revenue and expense categories. Exemplary helpdesk support 272 is operable to provide a suitable means for providing help support to visiting constituencies. Exemplary account status and payment 273 is operable to provide a suitable means for providing account status and payment information. Exemplary online order entry 274 is operable to provide a suitable means for enabling a visiting constituency to order particular information, such as company reports, for instance.

Exemplary community consensus channel 275 is operable to aggregate the upside and downside consensus forecasts upon which subscriber company management can communicate their relative outlook, if desired, enabling the subscriber company the ability to discuss a range for future performance. Exemplary community forecast channel 276 is operable to receive upside and downside consensus income statement estimates from the constituency community, allowing the community to quantify their understanding and expectation of future operations against which the management can communicate their relative views.

Exemplary research channel 277 is operable to provide, in conjunction with the other channels, securities research data wherein reports are automatically generated by pulling information from other channels and organization it into a professionally formatted research style report. Exemplary online Q&A channel 278 is operable to provide a real-time information exchange with searchable archives, enabling the constituency to quickly access relevant questions facing a company along with management's responses. Exemplary online conference channel 279 online conference channel 315 is operable to provide interactive conferences, forums and interviews administrated by the company. Exemplary financial history channel 280 is operable to provide historical financial results, enabling the company to adjust or remove revenues or expenses outside of the normal course of business, giving an "apples-to-apples" history. Exemplary newsroom channel 281 is operable to provide a depository of information relating to the company and its industry, such as press releases, articles and video clips. Each submission in this channel may be associated with a commentary by management discussing its relevance to the company.

Figure 2D:
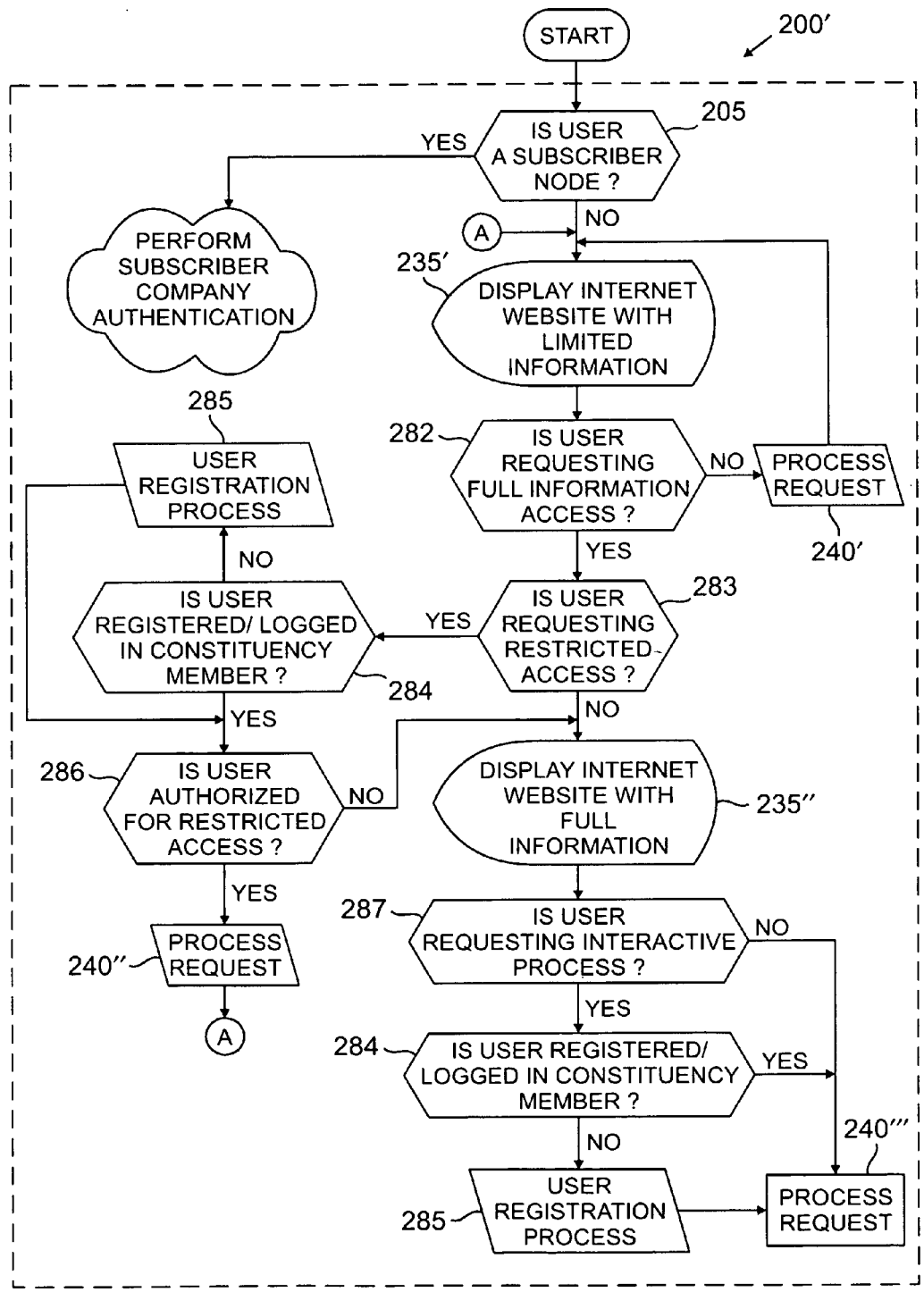
FIG. 2D illustrates a detailed flow diagram of an advantageous method of operating electronic commerce system of FIG. 1 for monitoring and controlling communication of information by the company node to ones of the constituency nodes via the global communications network and for analyzing and understanding reaction to such information communication by one or more of such constituency nodes, all in accordance with the principles of the present invention.

Referring next to FIG. 2D, illustrated is a more detailed flow diagram (generally designated 200') of an exemplary advantageous method of operating electronic commerce system 100 for monitoring and controlling communication of information by company node 105 to ones of constituency nodes 110a to 110n via a global communications network 115 and for analyzing and understanding reaction to such information communication by one or more of such ones of constituency nodes 110a to 110n, all in accordance with the principles of the present invention. For purposes of illustration, concurrent reference is made to FIGS. 1A to 2C.

To begin, communications controller 120 of electronic commerce system 100 determines whether a current user is a subscriber company (e.g., company node 105) and, if so ("Y" branch of decision step 205), performs subscriber company authorization, for instance, possibly as set forth hereinabove with reference to FIG. 2A. However, if communications controller 120 determines that a current user is not a subscriber company (e.g., constituency node 110a to 110n; "N" branch of decision step 205), communications controller 120 displays a selected view of a portion of data repository 125—limited information (process step 235').

Communications controller 120, in response to a user request, determines whether current user has requested full information access and, if not ("N" branch of decision step 282), processes current user request to review or otherwise process the selected view of the portion of data repository 125 (process step 240').

If communications controller 120, however, determines that the current user has requested full information access ("Y" branch of decision step 282), communications controller 120 determines whether the current user has requested access to restricted information (e.g., access limited to employees, vendors, customers, affiliates, subsidiaries, or the like associated, or connected, with a particular company; for instance, with respect to an employee, the requested restricted access may suitably be to the company's human resources ("HR") system, possibly via a web page (whether Internet or intranet)). If communications controller 120 determines that the current user has requested access to restricted information ("Y" branch of decision step 283), communications controller 120 determines whether the current user is a logged-in/registered constituency member.

If communications controller 120 determines that the current user is not a logged-in/registered constituency member ("N" branch of decision step 284), communications controller 120 logs in/registers the current user (process step 285). Communications controller 120 determines whether the current user, that is logged-in/registered, is authorized for restricted access to company restricted access information and, if so ("Y" branch of decision step 286), processes current user request to review or otherwise process the selected view of the portion of data repository 125 associated with restricted access (process step 240").

If communications controller 120 determines either that (i) the current user has not requested access to restricted information ("N" branch of decision step 283) or (ii) the current user, that is logged-in/registered, is not authorized for restricted access to company restricted access information ("N" branch of decision step 286), communications controller 120 displays a selected view of a portion of data repository 125—full information (process step 235"). Communications controller 120 determines whether the current user is requesting an interactive process (e.g., interaction with on-line Q&A channel 278, etc.) and, if not ("N" branch of decision step 287), communications controller 120 processes the current user request to review or otherwise process the selected view of the portion of data repository 125 associated with full information access (process step 240'''").

Otherwise ("Y" branch of decision step 287), communications controller 120 determines whether the current user is a logged-in/registered constituency member and, if not ("N" branch of decision step 284), communications controller 120 logs in/registers the current user (process step 285). Communications controller 120 processes the current user, that is logged-in/registered, request interact with electronic commerce system 100 while reviewing or otherwise processing the selected view of the portion of data repository 125 associated with full information access (process step 240'''").

Figure 3A:
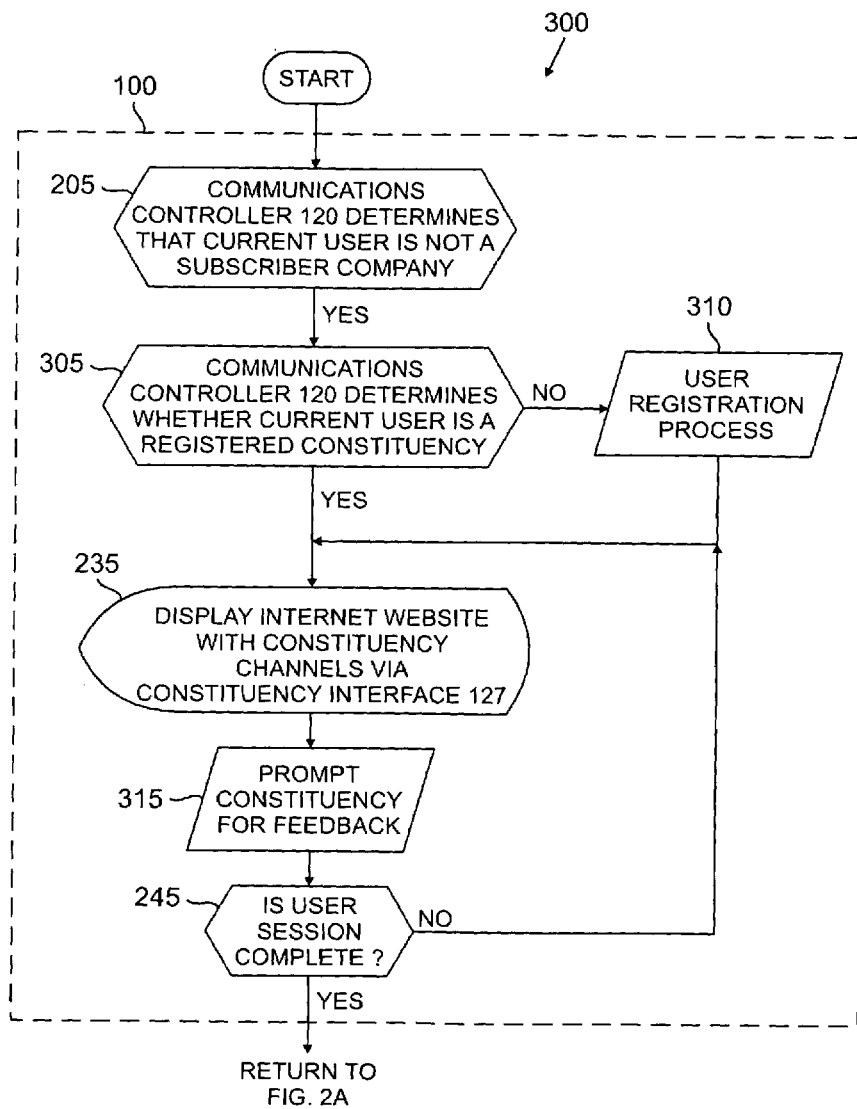
FIG. 3A illustrates a flow diagram of an exemplary method of operating the electronic commerce system of FIG. 1 for monitoring and analyzing one or more constituencies understanding and reaction to subscriber company information disclosures, whether new or updated, all in accordance with the principles of the present invention.

Referring next to FIG. 3A, illustrated is a flow diagram (generally designated 300) of an exemplary method of operating electronic commerce system 100, and, particularly, communications controller 120, of FIG. 1 for monitoring and analyzing one or more constituencies understanding and reaction to subscriber company information disclosures, whether new or updated, all in accordance with the principles of the present invention. Again, concurrent reference is made to FIGS. 1A to 2D for purposes of illustration.

To begin, communications controller 120 determines that a current user is not a subscriber company (e.g., constituency node 110a to 110n; "N" branch of decision step 205). Communications controller 120 then determines whether the current user is a registered user, e.g., a constituency member (decision step 305).

If the current user is not a registered user/constituency member ("N" branch of decision step 305), then communications controller 120 prompts the user through a constituency registration process (process step 310).

Communications controller 120 displays a selected view of a portion of data repository 125 as a function of identifying the user/constituency member and their associated constituency node 110 (process step 235). According to the illustrated embodiment, while communications controller processes constituency node 110 requests to review or otherwise process one or more selected views of the portion of data repository 125 (process step 240 of FIG. 2A), communications controller prompts the user/constituency member via constituency node 110 and interface 127 for feedback to analyze constituency understanding and reaction to commercial information communicated by company node 105 to constituency node 110 (process step 315). Thus, the user/constituency member interacts with communications controller 120 while viewing subscriber company generated information communications or commercial information through constituency interface 127, proving valuable feedback to the subscriber company.

For instance, if the subscriber were to publish a press release, communications controller 120, through constituency feedback, may suitably inform the subscriber company whether the press release was received as intended by one or more select constituencies. If the exemplary press release was in fact not properly received, then the subscriber company, via company node 105 and communications controller 120 may suitably modify one or more data files 129 associated with the subscriber company to provide additional comment to the press release to thereby ensure that the subject press release is received as intended by the one or more select constituencies. Further, the press release and related comment are fully disseminated to all constituencies via communications interfaces 127 thereby ensuring fair disclosure of commercial information in accord with the above-described requirements of the SEC (and like entities in other countries).

In prompting the user/constituency member for feedback, electronic commerce system 100 and, particularly, communications controller are operable to process the gathered feedback information and, in response thereto, modify particular ones of data files 129 for use by communications controller 120 and company node 105. According to one advantageous embodiment, communications controller 120 analyzes the gathered feedback information along with ones of data files 129 and, in response thereto, reports results thereof to company node 105. According to a related embodiment, communications controller 120, while gathering feedback information, employs mathematical representations to represent at least one of constituency understanding or constituency reaction in data repository 125 for use in such analysis.

Figure 3B:
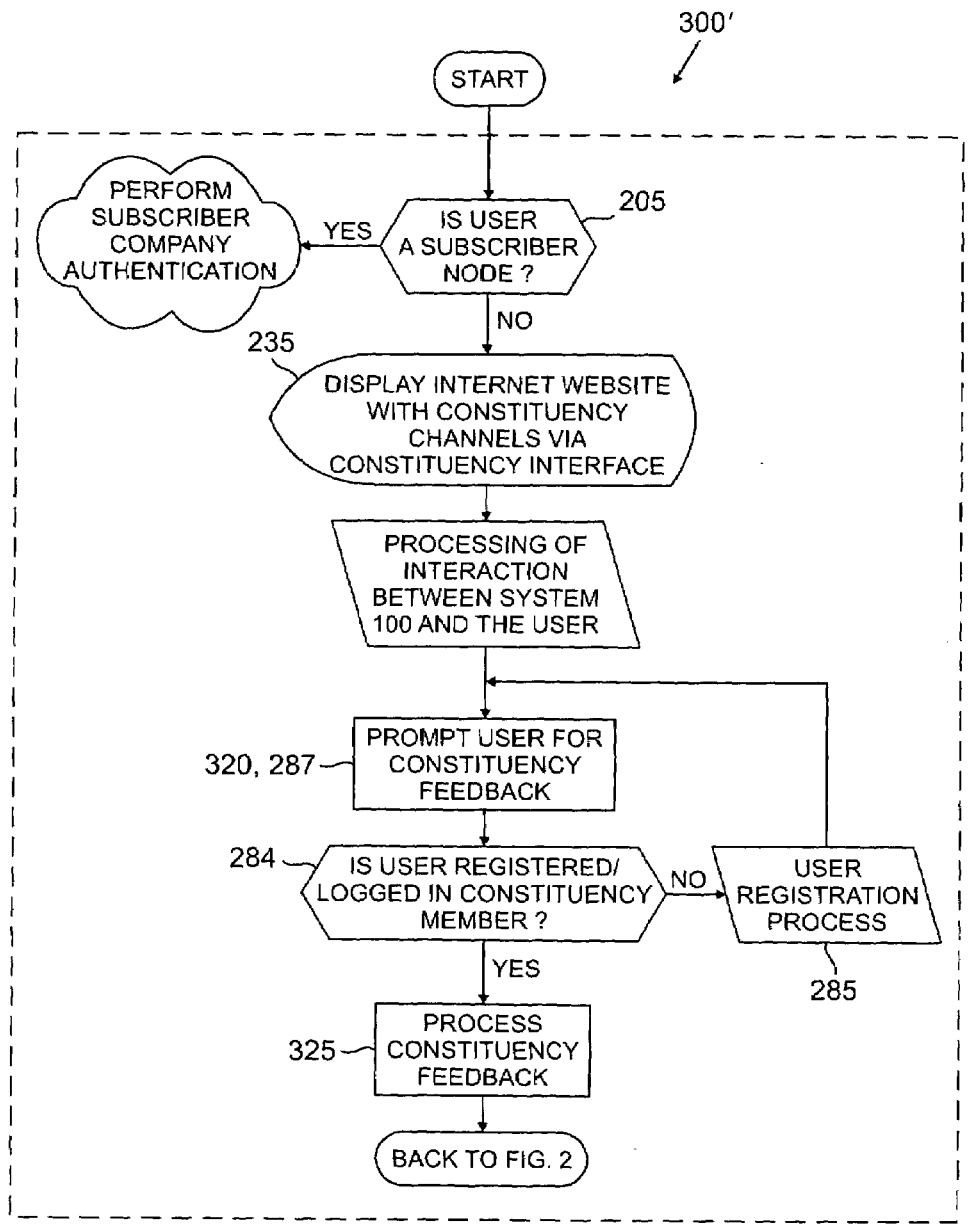
FIG. 3B illustrates a flow diagram of an exemplary advantageous method of operating the electronic commerce system of FIG. 1 for monitoring and analyzing one or more constituencies understanding and reaction to subscriber company information disclosures, whether new or updated, all in accordance with the principles of the present invention.

Referring next to FIG. 3B, illustrated is a flow diagram (generally designated 300') of an exemplary advantageous method of operating electronic commerce system 100, and, particularly, communications controller 120, of FIG. 1 for monitoring and analyzing one or more constituencies understanding and reaction to subscriber company information disclosures, whether new or updated, all in accordance with the principles of the present invention. Again, concurrent reference is made to FIGS. 1A to 2D for purposes of illustration.

According to this related embodiment, to begin, communications controller 120 of electronic commerce system 100 determines whether a current user is a subscriber company (e.g., company node 105) and, if so ("Y" branch of decision step 205), performs subscriber company authorization, for instance, possibly as set forth hereinabove with reference to FIG. 2A. However, if communications controller 120 determines that a current user is not a subscriber company (e.g., constituency node 110a to 110n; "N" branch of decision step 205), communications controller 120 displays a selected view of a portion of data repository 125—limited information (process step 235).

For purposes hereof, subsequent interaction between electronic commerce system 100 and the current user may be as described with reference to FIGS. 2A to 2D. Communications controller 120 prompts the current user for constituency feedback (interactive process step 287; sub-process step 320)—and, if the current user is logged in/registered ("Y" branch of decision step 284), then communications controller in cooperation with data repository 125 process constituency feedback (process step 325). Communications controller thereby analyzes constituency understanding and reaction to commercial information communicated by company node 105 to constituency node 110. Thus, the user/constituency member interacts with communications controller 120 while viewing subscriber company generated information communications or commercial information through constituency interface 127, proving valuable feedback to the subscriber company.

In accord with the illustrated embodiment, data repository 125 under the control of communications controller 120 may be suitably arranged to monitor constituency node 110 response to and possibly initiate an alert notification to subscriber company via company node 105, all of which may or may not be based upon subscriber company defined parameters.

Figure 4:
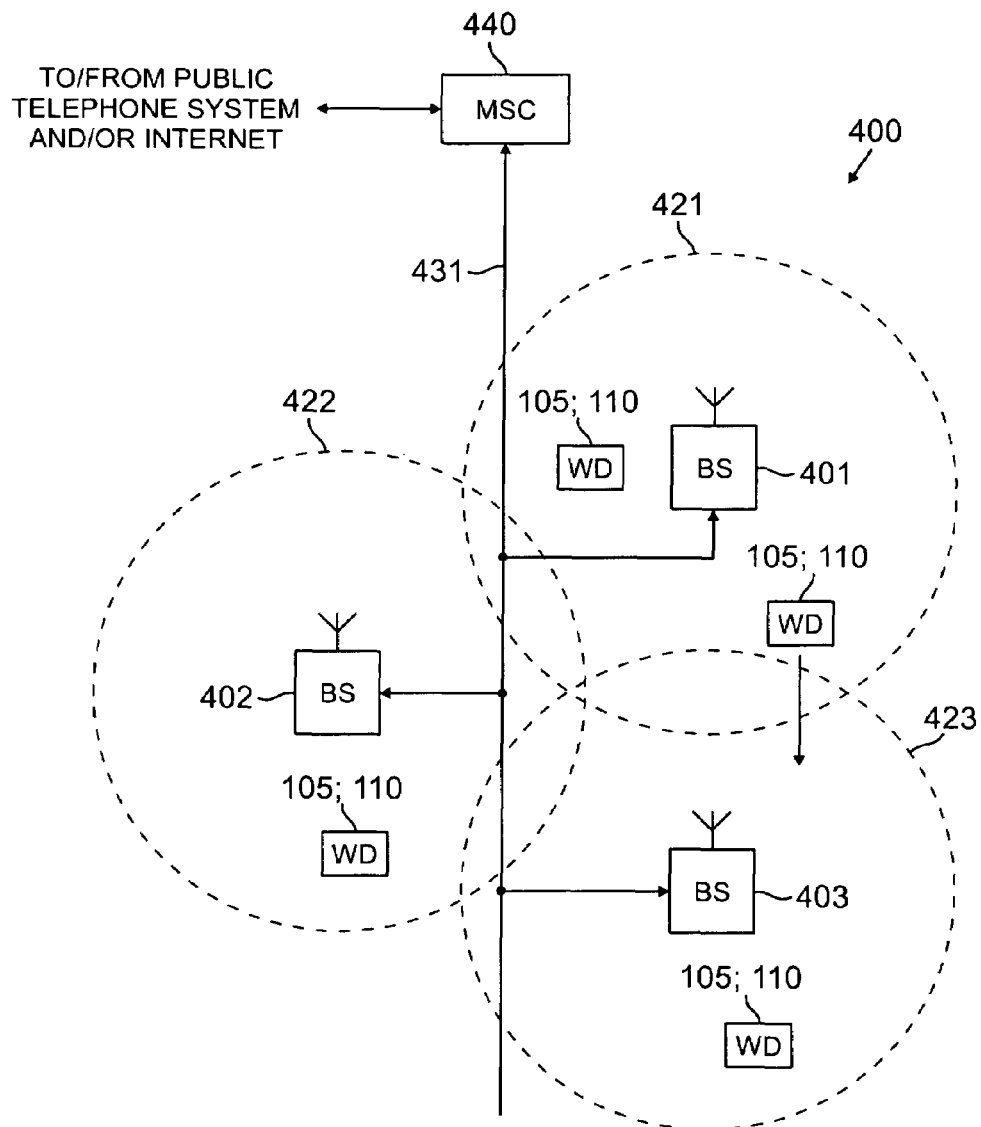
FIG. 4 illustrates a general overview of an exemplary wireless network according to one embodiment of the present invention.

Referring lastly to FIG. 4, illustrated is a general overview of an exemplary wireless network 400 according to one embodiment of the present invention. Concurrent reference is made to FIGS. 1A to 3B for purposes of illustration.

Exemplary wireless network 400 comprises a plurality of cell sites 421 to 423, each containing one of the base stations ("BS") 401 to BS 403. Exemplary base stations 401 to 403 are operable to communicate with a plurality of wireless devices ("WD") 105; 110. Exemplary WDs 105; 110 may suitably function as any of company or constituency nodes 105; 110 and may be any suitable wireless communication devices, including conventional cellular telephones, PCS handsets, portable computers and data assistants, telemetry devices, and the like, that are capable of communicating with the base stations via wireless links.

Illustrative dotted lines are introduced to illustrate approximate boundaries of cell sites 421 to 423 in which base stations 401 to 403 are located. Exemplary cell sites 421 to 423 are shown approximately circular for the purposes of illustration and explanation only. It should be clearly understood that cell sites 421 to 423 also may have irregular shapes, depending on the cell configuration selected and natural and man-made obstructions.

BS 401 to 403 may be operable to transfer voice and data signals between each other and the public telephone system (not shown) via communications line 431 and mobile switching center ("MSC") 440. MSC 440 is well known to those skilled in the art. Mobile switching center 440 is a switching device that provides services and coordination between the subscribers in a wireless network (e.g., company nodes 105 and constituency nodes 110) and external networks. Communications line 431 may be any suitable connection means, including a T1 line, a T3 line, a fiber optic link, a network backbone connection, a wireless link and the like. In some embodiments of the present invention, communications line 431 may be several different data links, where each data link couples one of BS 401 to 403 103 to MSC 440. In addition, as is well known, a "handoff" is a transfer control of a call from a first cell to a second cell.

According to this embodiment, one or more of WDs 105; 110 in wireless network 400 may suitably be capable of executing real time applications, such as any of the functions of company nodes 105 and constituency nodes 110 of the above-disclosed embodiments. Thus, any of WDs 105; 110 may suitably be associated with electronic commerce system 100 and be capable of interacting with communications controller 120 and data repository 125. Again, according to this embodiment, communications controller 120 and data repository 125 are broadly operative to provide: (i) indexing and cross-referencing of company information by each subject of significance within data repository 125 to one or more constituencies; (ii) an automated interface for placing or updating information disclosures on the communications conduit via global communications network 115 to constituency nodes 110a to 110n; and (iii) monitoring and analyzing one or more constituencies' understanding and reaction to such new or updated information disclosures using communications controller 120.

Accordingly, wireless network 400 operates to receive real time data from, for example, Internet 115 and to transmit the same in a forward channel to ones of WDs 105; 110 in accordance with electronic commerce system 100. According to this embodiment, the wireless nodes 105; 110 operate to provide session scheduling for intelligent communication. Typical embodiments provide communications management functionality requiring a minimum of user control. Communication of commercial information between nodes 105; 110 is enabled automatically in a manner which avoids unnecessary, annoying or ineffective interruptions. For instance, a constituency member may have multiple constituency nodes 110, such as a PCS phone and a PCS PDA. The constituency member may specify the type, amount, etc. of commercial information it wishes to receive depending on which device is being used; depending upon the device being used, communications controller 120 using data repository 125 can cooperatively alert the constituency member in a preferred manner dependent upon the wireless node used.

Further, with respect to data communicated by the user of wireless node 105; 110, an illustrative example would be useful. For instance, if one of WDs 105; 110 is a 3G cellular phone device that is capable of surfing the Internet and is controlled by a company node 105 user, IVR services may suitably be used to enable the wireless user to securely access associated data files 129 and to update the same using continuous speech. Alternatively, a constituency member controlling the same device may suitably access constituency channels and interact with electronic commerce system 100 to provide feedback or IVR based-service selection.

As is clear from the discussion of the foregoing illustrative embodiments, the present invention is broadly directed to an electronic commerce system 100 for monitoring communication of information by company node 105 to constituency nodes 110 and analyzing constituency understanding and reaction to such information communication, as well as methods of operating the same. Electronic commerce system 100, which is for use over a global communications network includes both company nodes 105 and constituency nodes 110, comprises communications controller 120 and data repository 125. Data repository 125 is operable to store data files associated with company nodes 105, wherein company nodes 105 populate respective associated data files 129 with commercial information. Communications controller 120 is operable to (i) propagate communication interfaces 127 accessible by constituency nodes 110 with selected portions of the commercial information under direction of company nodes 105, and (ii) gather feedback information representative of constituency response to the constituency nodes 110 accessing the communication interfaces 127. Company node 105, through communications controller 120 and associated data repository 125, may suitably provide an interactive system that enables the company to generate and near-continuously communicate information to its constituency via global communications network 115, for instance the Internet.

Although the present invention has been described in detail, those skilled in the art should understand that they can make various changes, substitutions and alterations herein without departing from the spirit and scope of the invention in its broadest form.

What is claimed is:

1. For use over a global communications network having company nodes and constituency nodes associated therewith, a method of operating an electronic commerce system having a data repository and a communications controller, said method of operation comprising:

storing data files associated with said company nodes in said data repository, wherein said company nodes populate respective associated data files with company information and wherein each set of said company information relates to a specific company that is represented by a specific company node;

allowing said specific company node to modify said set of said company information that is stored in said data files relating to said specific company;

allowing said specific company node to control times at which selected portions of said set of said company information in said data files relating to said specific company are first made available to said constituency nodes;

propagating communication interfaces accessible by said constituency nodes and facilitating access by said constituency nodes to said selected portions of said set of said company information, wherein said communication interfaces are propagated under control of said specific company node in a manner that ensures compliance with one or more governmental disclosure requirements applicable to one or more companies associated with the company nodes; and gathering feedback information representative of constituency response to said constituency nodes accessing said communication interfaces.

2. The method of operating the electronic commerce system for use over a global communications network recited in claim 1 further comprising processing said gathered feedback information and, in response thereto, modifying said set of said company information in said data files relating to said specific company.

3. The method of operating the electronic commerce system for use over a global communications network recited in claim 2 further comprising analyzing said gathered feedback information and said set of said company information in said data files relating to said specific company and, in response thereto, reporting results thereof to said specific company node.

4. The method of operating the electronic commerce system for use over a global communications network recited in claim 1 further comprising, while gathering said feedback information, employing mathematical representations to represent at least one of constituency understanding and constituency reaction.

5. The method of operating the electronic commerce system for use over a global communications network recited in claim 1 further comprising limiting, with respect to data files associated with said specific company node, access to said data files associated with said specific company to designated personnel of said specific company.

6. The method of operating the electronic commerce system for use over a global communications network recited in claim 5 comprising using an interactive voice recognition controller to verify the identity of said designated personnel.

7. The method of operating the electronic commerce system for use over a global communications network recited in claim 1 further comprising translating said selected portions of said company information from a first language into a second language.

8. The method of operating the electronic commerce system for use over a global communications network recited in claim 1 further comprising indexing and relating associated portions of said company information in the data repository.

9. The method of operating the electronic commerce system for use over a global communications network recited in claim 1 further comprising organizing said selected portions of said set of said company information that are propagated by said communication interfaces into channels accessible by said constituency nodes.

10. For use over a global communications network having company nodes and constituency nodes associated therewith, an electronic commerce system comprising:

a data repository that is operable to store data files associated with said company nodes, wherein said company nodes populate respective associated data files with company information, wherein each set of said company information relates to a specific company that is represented by a specific company node; and a communications controller that is operable to (i) allow said specific company node to modify a set of said company information that is stored in said data files and that relates to said specific company and to control times at which selected portions of said set of said company information in said data files relating to said specific company are first made available to said constituency nodes, (ii) propagate communication interfaces accessible by said constituency nodes and facilitating access by said constituency nodes to said selected portions of said set of said company information under control of said specific company node in a manner that ensures compliance with one or more governmental disclosure requirements applicable to one or more companies associated with the company nodes, and (iii) gather feedback information representative of constituency response to said constituency nodes accessing said communication interfaces.

11. The electronic commerce system for use over a global communications network recited in claim 1 wherein said communications controller is further operable to process said gathered feedback information and, in response thereto, modify said set of said company information in said data files relating to said specific company.

12. The electronic commerce system for use over a global communications network recited in claim 11 wherein said communications controller is further operable to analyze said gathered feedback information and said set of said company information in said data files relating to said specific company and, in response thereto, to report results of said analysis to said specific company node.

13. The electronic commerce system for use over a global communications network recited in claim 1 wherein said communications controller, while gathering said feedback information, employs mathematical representations to represent at least one of constituency understanding and constituency reaction.

14. The electronic commerce system for use over a global communications network recited in claim 1 further comprising a security controller that is operable, with respect to those data files associated with said specific company, to limit access to said data files associated with said specific company to designated personnel of said specific company.

15. The electronic commerce system for use over a global communications network recited in claim 14 wherein said security controller includes an interactive voice recognition controller that is operable to verify the identity of said designated personnel.

16. The electronic commerce system for use over a global communications network recited in claim 1 wherein said communications controller is further operable to translate said selected portions of said company information from a first language into a second language.

17. The electronic commerce system for use over a global communications network recited in claim 1 wherein said communications controller is further operable to store, index and relate associated portions of said company information in the data repository.

18. The electronic commerce system for use over a global communications network recited in claim 1 wherein said communications controller is further operable to organize said selected portions of said set of said company information that are propagated by said communication interfaces into channels accessible by said constituency nodes.

19. The electronic commerce system for use over a global communications network recited in claim 18 wherein said channels include at least two of an overview channel, an outlook channel, a community consensus channel, a community forecast channel, a research channel, an online q&a channel, an online conference channel, a financial history channel and a newsroom channel.

20. The electronic commerce system recited in claim 1, wherein said communications controller is operable to ensure compliance with said one or more governmental disclosure requirements by fully disseminating said selected portions of said set of said company information to said constituency nodes.

21. The electronic commerce system recited in claim 1, wherein said communications controller is operable to control availability of said selected portions of said set of said company information to the constituency nodes by:
  allowing multiple versions of a single data file to be stored in said data repository; and
  refraining from propagating said selected portions of said set of said company information in said data files to said constituency nodes until said specific company node indicates that a specific version of said selected portions of said set of said company information in said data files is ready for distribution.

22. For use over a global communications network having company nodes and constituency nodes associated therewith, an electronic commerce system comprising:
  a data repository that is operable to store data files associated with said company nodes, wherein said company nodes populate respective associated data files with company information wherein each set of said company information relates to a specific company that is represented by a specific company node; and
  a communications controller that is operable to:
  allow said specific company node to modify a set of said company information that is stored in said data files and that relates to said specific company and to control times at which selected portions of said set of said company information in said data files relating to said specific company are first made available to said constituency nodes;
  propagate communication interfaces accessible by said constituency nodes and facilitating access by said constituency nodes to said selected portions of said set of said company information under control of said specific company node in a manner that ensures compliance with one or more governmental disclosure requirements applicable to one or more companies associated with the company nodes,
  gather feedback information representative of constituency response to said constituency nodes accessing said communication interfaces,
  process and analyze said gathered feedback information and, in response thereto, to at least one of (a) modify said set of said company information in said data files and (b) report results of said analysis to said specific company node, and
  limit access, with respect to data files associated with said specific company node, to designated personnel of said specific company.

* * * * *